Feb. 7, 1939.　　R. HERRMANN ET AL　　2,146,143
PERIODICAL ABSORPTION REFRIGERATOR
Filed May 11, 1936
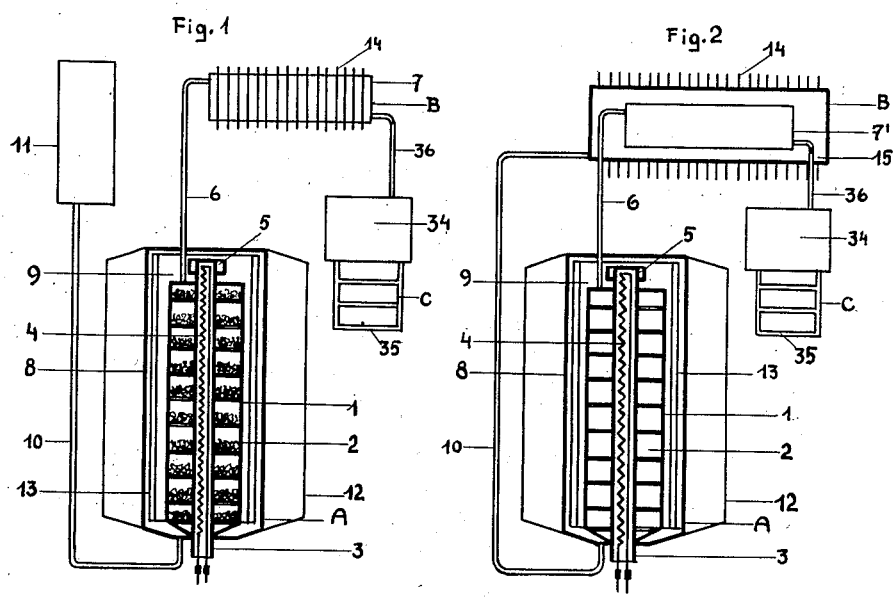
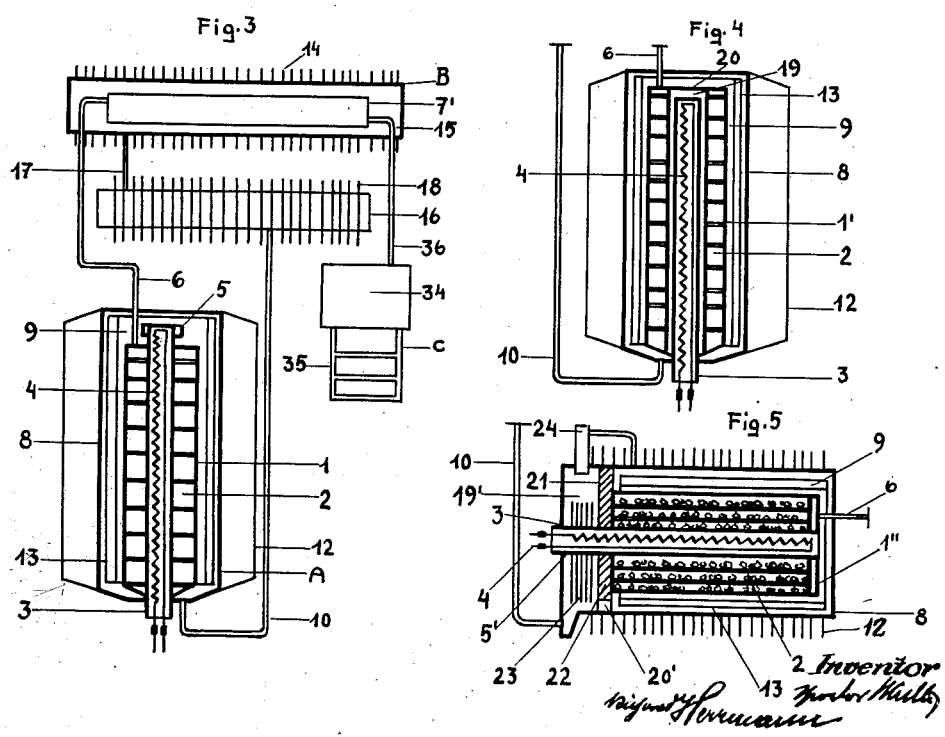

Patented Feb. 7, 1939

2,146,143

UNITED STATES PATENT OFFICE 2,146,143

PERIODICAL ABSORPTION REFRIGERATOR

Richard Herrmann and Theodor Skutta, Vienna, Austria

Application May 11, 1936, Serial No. 79,144
In Austria May 15, 1935

4 Claims. (Cl. 62—118)

It has already been proposed to provide periodical absorption or adsorption refrigerators with solid absorption substance, wherein the latter, as well as the condensing refrigerating medium are on the outer surfaces of the boiler-absorber or the condenser, in direct heat exchange with the surrounding air. Furthermore, it is known to provide absorption refrigerators, wherein continuously flowing cooling water controlled by valves is responsible for the removal of the absorption or condensation heat, thereby speeding up the operating cycles. The first mentioned arrangement, which operates without cooling water, has the defect that during the heating period considerable amounts of heat are unduly given off into the space to be cooled owing to the unappreciated heat conductive connection between the absorption mass and the outer shell of the boiler-absorber, which, moreover, is provided with cooling ribs. On the other hand, in this construction it is not possible permanently to insulate the absorption mass against heat losses, since in the next following absorption period the stored heat and the heat now developing must be conducted away as rapidly as possible. In the refrigerator mentioned in second place and operating with cooling water the defect, which asserts itself particularly from the point of view of installation, is that the device requires flowing water for its operation, the passage of which can only be controlled by movable means, subject to mechanical wear. As distinct from the known constructions the invention utilizes the novel means hereinafter described, which render the refrigerator independent of the utilization of flowing cooling water. These means, which according to the invention are to be employed in the construction of refrigerators operating periodically according to the absorption or adsorption principle are as follows:—

1. Considerable restriction of heat transfer from the boiler-absorber to the surroundings during the driving out period of the cooling medium by the insertion of a heat insulating layer of gas between the container of the absorption substance and the outer shell of the boiler-absorber.

2. Rapid cooling of the boiler-absorber and its contents absorbing the cooling medium at the beginning of the absorption period by a cooling liquid taking the place of the layer of gas mentioned under (1), whereby the setting in of the gas absorption and therewith of the cooling process in the vapourizer is accelerated. The cooling liquid at the same time forms a good heat conducting connection between the container of the absorbing agent and the outer shell of the boiler-absorber, through which the heat generated at the absorption process is easily given off to the surroundings.

3. Improved heat dissipation from the condensing carrier of cold by heat exchange with a cooling liquid when the heat of condensation is given off through this cooling liquid and the cooling ribs of the condenser to the surroundings.

4. Protection of the gaseous carrier of cold flowing back into the boiler-absorber during the absorption period (vaporization) against admission of heat from the surroundings on its way through the condenser, by the formation of a heat insulating layer of gas existing during the absorption process between the condensing space and the outer shell of the condenser.

The refrigerator comprises the known individual parts, but modified in construction according to the invention, of all periodically operating absorption or adsorption machines, i. e. a boiler-absorber, the condenser and the evaporator, combined with a storage tank for the condensate built in outside the refrigerating chamber in a heat insulated manner, and may be arranged to operate either with electric direct or alternating current heating, or with gas heating or any other source of heat.

In the accompanying drawing, refrigerators embodying the invention are illustrated diagrammatically by way of example.

In the drawing

Fig. 1 shows a refrigerator with a separate auxiliary tank connected to its cooling-liquid container, and a separate condenser connected to its boiler-absorber.

Fig. 2 shows a refrigerator in which the condenser is surrounded by the auxiliary tank.

Fig. 3 shows a refrigerator arranged substantially as shown in Fig. 2, but with an intermediate cooling tank between the auxiliary tank and the cooling liquid container.

Fig. 4 shows a vertical boiler-absorber and cooling-liquid container unit with a gas liberating chamber at the top.

Fig. 5 shows a horizontal unit with the gas collector at one end.

The boiler-absorber, indicated at A, Fig. 1, comprises a container 1 closed on all sides, which receives in its hollow space 2 the absorption medium for the carrier of cold. In this container 1 the heating tube 3 with the heating body 4 is disposed preferably centrally. The space 2 is provided in known manner with shelves for receiving the absorbing substance, or if absorbing liquids are employed with cup shaped partitions, through the gas conduit 6 it communicates with a condenser 7 and through this via the pipe 36 with the vapourizer system C. The container 1 and a preferably cup shaped part 5 surrounding the upper end of the heating body tube 3 are surrounded on all sides by a closed tank 8, whereby the intermediate space 9 for the reception of the cooling liquid is formed. This space 9 communicates through a pipe 10 connected to its lowermost point with a closed auxiliary tank 11. Cooling ribs 12 on the shell of the container 8 complete the boiler-absorber. As cooling liquid for the absorption medium a solution of gases in liquids composed of two or more components, as for instance a solution of ammonia ($NH_3$) in water, or the solution of compounds in liquids is utilized, which dissociate in gaseous condition for instance ammonium carbonate in water. The saturation pressure of the cooling liquid increases to such an extent when part of the whole quantity of liquid is heated that it is forced by the gases liberated therefrom from the space 9 through the pipe 10 into the tank 11. Shortly after the beginning of the heating sufficient gas is evolved from the liquid contained in cup 5 of the heating tube 3 owing to the rapid heating thereof, said gas forcing the remaining part of the cooling liquid from the chamber 9 into the auxiliary tank 11. Owing to this the space 9 between the container 1 and the outer shell 8 remains filled with gas for the rest of the heating period, and in this manner a good heat insulating intermediate layer is formed which protects the boiler-absorber during the driving out period from heat losses to the surroundings. This protection may be further improved by the provision of metal walls 13 between the containers 1 and 8, said walls intercepting and reflecting the heat rays generated by 1. When the driving out (heating) period is completed, the shell 8 of the cooling-liquid container with its ribs 12 cools the gas enclosed in the space 9 owing to heat exchange with the surrounding air, the volume of said gas being thus reduced, the cooling liquid returning from the auxiliary tank 11 into the space 9. The cooling liquid then again absorbs the quantity of gas liberated at the beginning of the driving out and thereby rises in the container 9, at the same time absorbing heat from the boiler-absorber 1 and from the latter owing to mixing, thereby introducing the absorption process due to the reduction of the temperature of the absorbing medium. At the same time the cooling liquid forms a heat conductive connection between the boiler-absorber 1 and the cooling-liquid-container shell 8 and thus with the heat dissipating means of the boiler-absorber, whereby on the one hand the discharge of the heat stored during the driving out period and on the other hand the transfer of the heat liberated during the receiving period to the surroundings is rendered possible in the time at disposal. The concentric radiating plates 13 do not obstruct the heat dissipation, since they are sprinkled on both sides by the cooling liquid. If the proportion of the quantity of cooling liquid with reference to the amount of heat stored in the boiler-absorber during the driving out period is so selected that the temperature of the absorbing medium is reduced to such value when cooling sets in, at which the gas absorption commences in the tube system accompanied by considerable reduction of pressure (e. g. in the calcium chloride-ammonia system to about +55° C.), then in the vaporizer system C a low evaporation temperature sets in at once, at which the cooling process commences almost simultaneously with the cutting out of the boiler-absorber.

The receiving tank 11 may be conveniently combined with the condenser, as shown in Fig. 2. The arrangement is similar to that in Fig. 1 but is altered here in so far as the auxiliary vessel is formed as a tank 15 surrounding on all sides the condenser 7. The tank 15 is provided on its outer surface with cooling ribs 14. If at the beginning of the driving out period cooling liquid is forced into the tank 15 from the boiler-absorber, it forms a heat conductive connection between the two heat-discharging surfaces and moreover accelerates the condensation of the refrigerant owing to the absorption of mixing heat. After the driving out of gas has been completed and after the return of the cooling liquid into the container 8, the tank 15 which is now filled with gas and free of liquid prevents any considerable admission of heat from the surroundings to the back flowing refrigerant. The advantage of the arrangement described against condensing containers which are in direct heat exchange with the surrounding air is significant, inasmuch as in the latter the heat absorbed by the back flowing refrigerant together with the heat formed in the boiler-absorber must be conducted away to the surroundings within a limited period of time, which requires an increase in the heat exchange agent of the boiler-absorber.

In order to prevent the return of the cooling liquid heated to condensation temperature into the boiler-absorber, which would cause an increase in the mixing temperature, an intermediate cooling tank may be disposed according to the invention between the boiler-absorber and the condenser, as shown in Fig. 3. This intermediate tank 16 is connected by the pipe 10 with the cooling liquid space 9 and through the pipe 17 with the tank 15 and is provided with cooling ribs 18. The intermediate tank 16 remains filled with cooling liquid during the driving out as well as during the absorption period, so that when cooling liquid is forced out of the container 9 the quantity of liquid (of room temperature) in the intermediate tank 16 passes into the tank 15, while the heated liquid following from the boiler-absorber can cool down to room temperature in the container 16 during the driving out. Conversely, at the beginning of the absorption the liquid pre-cooled in the tank 16 returns into the container 9, on the other hand the contents of the tank 15 heated to condensing temperature is again cooled to room temperature through the ribs 18 on the intermediate tank 16 during the absorption period. The interposition of the container 16 thus enables the employment, in the manner described, of a cooling liquid always cooled to a low temperature, i. e. approximately to the temperature of the surroundings, in the boiler-absorber as well as in the condenser, and thus to assure the maximum cooling effect.

In Figs. 1 to 3 the quantity of gas necessary for forcing out the whole of the cooling liquid from the container 9 is liberated by heating part of the cooling liquid contained in comparatively small cup 5 of the heating tube 3. Fig. 4 shows means for liberating the quantity of gas required in a much shorter time. Here, in the container 1 for receiving the absorption medium, a chamber 19 open at the bottom and closed at the top is disposed, which communicates with the cooling liquid container 9 and is connected thereto at the top by a small opening 20. The pipe 3 with the heating body 4 is completely enclosed by this chamber 19. At the beginning of the heating first only the portion of the cooling liquid located in the chamber 19 is heated and gas is liberated therefrom at once, since it is prevented from giving off heat to the rest of the cooling liquid by the chamber, and drives out the remaining liquid which is at room temperature.

When refrigerators are assembled it is sometimes necessary to dispose the boiler-absorber and the cooling-liquid container in horizontal or any desired inclined position. Fig. 5 shows a horizontal unit, wherein the chamber is disposed laterally. The container for the cooling liquid is here divided by a wall 21 into two spaces 9 and 19' of which the space 9 receives the boiler-absorber 1'' for the absorption medium, while 19' forms the liberating chamber for the forcing out gas. The wall 21 is preferably heat insulated from the space 9 by a layer 22 of burnt clay or the like. Communication apertures 20' for the cooling liquid and 24 for the forced out gas connect the spaces 9 and 19' with one another. The horizontal heating body 4 is, as in the previous embodiments, enclosed in a protecting tube 3, which is preferably provided in the space 19' with ribs 23 giving off heat to the liquid, so that the evolution of gases is continued even after the level of the liquid has fallen under the lowermost point 5' of the tube 3 during the forcing out. The discharge pipe 10 for the forced out liquid is here preferably attached through a funnel shaped extension to the lowermost point of the container. When the heating commences gas is liberated in the chamber 19', said gas rising in a U-shaped pipe conduit 24 and entering the chamber 9. The forced out cooling liquid passes through the opening 20' into the chamber 19' and through this via the pipe 10 into the auxiliary tank 11 of Fig. 1, or into the condenser tank 15 of Fig. 2 or into the intermediate tank 16 of Fig. 3.

What we claim is:

1. A periodically operating absorption refrigerator comprising a closed boiler-absorber, means for heating the boiler-absorber, a condenser connected to the boiler-absorber, a closed container surrounding the boiler-absorber in spaced relation, heat-abducting means on the outer side of the container, a cooling liquid containing gas in solution in the space between the inner wall of the container and the outer wall of the boiler-absorber, and an auxiliary tank connected to the container for receiving the cooling liquid expelled from the space upon liberation of gas from the cooling liquid.

2. A periodically operating absorption refrigerator comprising a closed boiler-absorber, means for heating the boiler-absorber, a condenser connected to the boiler-absorber, a closed container surrounding the boiler-absorber in spaced relation, heat-abducting means on the outer side of the container, a cooling liquid containing gas in solution in the space between the inner wall of the container and the outer wall of the boiler-absorber, and an auxiliary tank connected to the container and arranged to surround the condenser.

3. A periodically operating absorption refrigerator comprising a closed boiler-absorber, means for heating the boiler-absorber, a condenser connected to the boiler-absorber, a closed container surrounding the boiler-absorber in spaced relation, heat-abducting means on the outer side of the container, a cooling liquid containing gas in solution in the space between the inner wall of the container and the outer wall of the boiler-absorber, an auxiliary tank arranged to surround the condenser, and an intermediate tank connected to the container and the auxiliary tank, for receiving the cooling liquid expelled from the space upon liberation of gas from the cooling liquid.

4. A periodically operating absorption refrigerator comprising a closed boiler-absorber, a heating tube in the boiler-absorber, an apertured end plate arranged on the boiler-absorber and defining, with the heating tube, a chamber accessible to the cooling liquid, a condenser connected to the boiler-absorber, a closed container surrounding the boiler-absorber in spaced relation, heat-abducting means on the outer side of the container, a cooling liquid containing gas in solution in the space between the inner wall of the container and the outer wall of the boiler-absorber, and an auxiliary tank connected to the container for receiving the cooling liquid expelled from the space upon liberation of gas from the cooling liquid.

RICHARD HERRMANN.
THEODOR SKUTTA.